United States Patent
Gaudiani et al.

(10) Patent No.: US 10,857,485 B1
(45) Date of Patent: Dec. 8, 2020

(54) FLUID SEPARATION APPARATUS AND SYSTEM

(71) Applicant: OSI Environmental LLC, North Royalton, OH (US)

(72) Inventors: Michael A. Gaudiani, Shaker Heights, OH (US); Jeff Mann, Wadsworth, OH (US)

(73) Assignee: OSI Environmental LLC, North Royalton, OH (US)

( * ) Notice: Subject to any disclaimer, the term of this patent is extended or adjusted under 35 U.S.C. 154(b) by 88 days.

(21) Appl. No.: 15/701,087

(22) Filed: Sep. 11, 2017

(51) Int. Cl.
*B01D 17/04* (2006.01)
*B01D 17/02* (2006.01)

(52) U.S. Cl.
CPC ....... *B01D 17/045* (2013.01); *B01D 17/0214* (2013.01)

(58) Field of Classification Search
None
See application file for complete search history.

(56) References Cited

U.S. PATENT DOCUMENTS

| | | | |
|---|---|---|---|
| 4,333,835 A * | 6/1982 | Lynch | B01D 17/00 210/305 |
| 5,454,937 A | 10/1995 | Lewandowski | |
| 6,056,128 A | 5/2000 | Glasgow | |
| 7,416,657 B2 * | 8/2008 | Kretchmar | B01D 17/045 210/95 |
| 2003/0127376 A1 * | 7/2003 | Maddock | B01D 17/0202 210/114 |

* cited by examiner

*Primary Examiner* — Krishnan S Menon
(74) *Attorney, Agent, or Firm* — Hahn Loeser & Parks LLP; Daniel J. Smola

(57) ABSTRACT

The coalescing separator apparatus includes a containment well including a coalescing media therein; an inlet for a fluid mixture, and an outlet for clean water. The inlet and outlet disposed on opposite sides of the coalescing media. The containment well also includes a variable-height weir and an outlet weir. The variable-height weir is coupled to a surface-skimming drain. The outlet weir includes a front wall and a middle wall, the outlet being disposed behind the middle wall, and the height of the front wall is higher than the height of the middle wall. The variable-height weir is configured to be vertically movable and set to a position from a minimum height and to a maximum height, the height being determined with reference to a bottom wall of the containment well. A method for skimming oil and other fluids from water or other fluids is also provided.

20 Claims, 5 Drawing Sheets

FLUID SEPARATION APPARATUS AND SYSTEM

FIELD

This disclosure relates to oil-skimming equipment.

BACKGROUND AND SUMMARY

Coalescing separators are designed to remove oil or other insoluble material from a liquid, usually water. Often the liquid is used as a coolant in machinery, such as, metal cutting machinery. Oil used as lubrication in such machinery becomes mixed with the coolant and often other materials such as metal particulates. In such a state, the mixture is unusable and even difficult to dispose of.

Oil separators such as floating tube skimmers and floating weir skimmers can be used in relatively large bodies such as containment pools or ponds. Many applications are not conducive to such large systems. Coalescing separator units are often used with smaller systems to remove and recycle oil from the coolant liquid. Sometimes the coolant liquid is also recycled.

Coalescing separators can control an overall liquid level, but they are not able to finely adjust the depth of the oil level that is being skimmed from the surface. Nor can the oil that is being skimmed be visually inspected for whether it is of an acceptable purity.

The articles "a," "an," and "the" should be interpreted to mean "one or more" unless the context clearly indicates the contrary.

SUMMARY

In an embodiment, a coalescing separator apparatus includes a containment well including a coalescing media therein; an inlet and an outlet on opposite sides of the coalescing media; a variable-height weir disposed in the containment well, coupled to a surface-skimming drain; and an outlet weir comprising a front wall and a middle wall, the outlet being disposed behind the middle wall, wherein a height of the front wall is higher than a height of the middle wall. The variable-height weir is configured to be vertically movable and set to a position between a minimum height and a maximum height, the height being determined with reference to a bottom wall of the containment well.

In an embodiment, a method for separating a first fluid and a second fluid, includes the steps of: flowing a mixture comprising the first fluid and the second fluid into a containment well that comprises a coalescing media; allowing the second fluid to coalesce from the first fluid and form a surface layer of the second fluid; adjusting a variable-height weir disposed in the containment well to a selected height relative to a bottom wall of the containment well; draining at least a portion of the second fluid from the surface layer of the second fluid through the variable-height weir; and flowing the first fluid out of the containment well.

In an embodiment, a coalescing separator apparatus includes: a means for containing a mixture of a first and second fluid, including a means for coalescing a second fluid; a means for inflowing the mixture and a means for outflowing the first fluid disposed on opposite sides of the means for coalescing. A means for skimming a surface layer of the second fluid including a means for vertically varying a height of the means for skimming the surface layer is also included.

DETAILED DESCRIPTION

Figure 1:
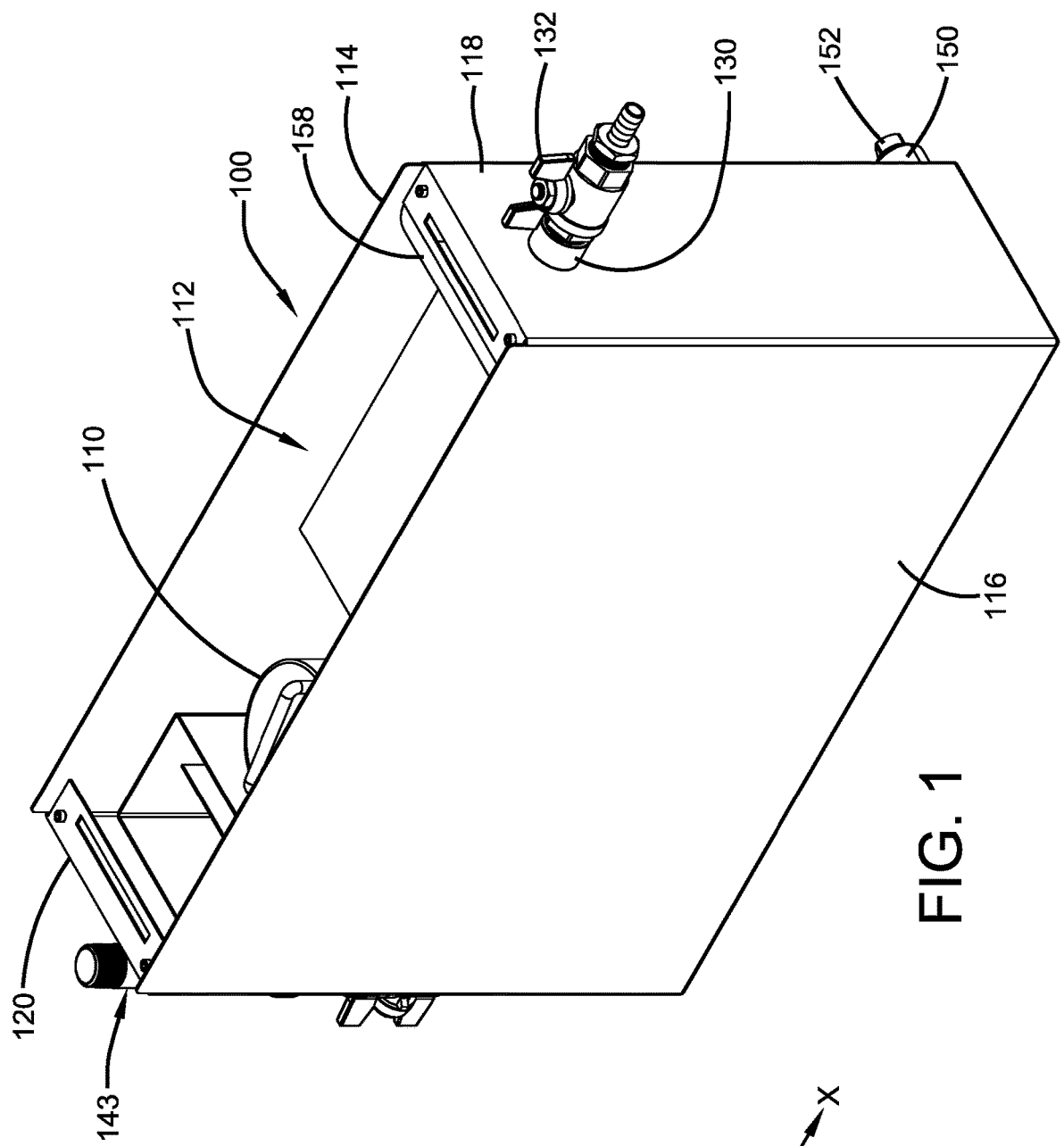
FIG. 1 is a perspective view of an example oil coalescing separator.

In an embodiment described herein, a variable-height weir for oil skimming is utilized in a coalescing separator apparatus. The variable-height weir is adjustable to directly raise or lower the highest level of drain in the separator apparatus. The height is adjustable to allow a user to operate the coalescing separator apparatus to directly remove a selected level of oil from the top surface of an oil/water mixture. This is in contrast to other separator devices, which only allow an adjustment of the total fluid (oil plus water) level in the entire containment well of the separator. Such prior art methods and devices do not allow fine control of the oil level being removed and also have the potential to disrupt the efficiency of a coalescing unit, by dropping the fluid level so low that part of the coalescing media is exposed to air. Adjusting the total fluid level in prior art solutions also requires either temporarily raising or lowering the inflow or outflow of fluid into the separator containment well and then readjusting it to an equilibrium level. In an embodiment, the apparatus described herein does not require two separate adjustments. As the viscosity and density of oil (or other fluids) differs from application to application, this provides a highly efficient way to finely adjust the level of oil that is removed from the top of the surface.

In an embodiment, the variable-height weir for oil skimming has an upward-facing sloping surface, forming an inlet for the variable-height weir, wherein the inlet at its outer rim is wider and travels down an upward-facing sloping surface that narrows as it goes down to a channel leading to the oil outlet (also referred to herein more generally as a surface-skimming drain). By "upward-facing sloping surface" it is meant a non-vertical and non-horizontal surface, or that the surface is visible in a view directly vertical from the surface, but is not completely horizontal. This flow over the upward-facing sloping surface provides the operator a visual indicator of whether the oil being skimmed is (1) high purity oil, in which case a smooth flow will be visually apparent; or (2) a mixture with significant amounts of water, in which case droplets will tend to form on the upward-facing sloping surface.

The terms "oil" (lower density fluid) and "water" (higher density fluid) are used throughout to refer to a primary example, but other higher density and lower density fluids can be substituted for these. For example, fluids that are not miscible with another, wherein the lower density fluid rests on top of the higher density fluid when combined in a common container can be separated with apparatuses and methods disclosed herein. Some notable examples of high and low density fluids other than water and oil are machine coolant fluid (similar to antifreeze) and oil, and water and silicone. In an embodiment, the system described herein can be used to separate a bottom portion from a layered combination of two, three, or more fluids to produce a column or portion that is composed of only the bottom layer.

FIG. 1 shows an embodiment of a coalescing separator apparatus 100 that includes a variable-height weir 110. The coalescing separator apparatus 100 comprises a containment well 112 that is bounded by five walls: a first side wall 114, an opposing second side wall 116, a first end wall 118, an opposing second end wall 120, and a bottom wall 122 (see FIG. 3). The five walls are joined together and sealed at the joints to be water and oil tight and form the containment well. Optionally, a top lid (not shown) may rest at the top of the containment well 112. The walls are made of a durable material that is resistant to oil, water, oxidizers, and other potential contaminants. For example, the walls may be made of metal, such as stainless steel and may be welded together at the joints.

The first end wall 118 is coupled to a mixed fluid inlet 130 that is also coupled to a valve 132. In an embodiment, the mixed fluid inlet 130 runs from a larger containment pool where another type of oil separator is running to send dirty or oily water to the coalescing separator apparatus 100. The other type of oil separator may, for example, be a tube skimmer, or a pool surface skimmer. In another embodiment, the mixed fluid may be received into the mixed fluid inlet 130 directly from machinery or a coolant and oil containment pool. In an embodiment, the mixed fluid is pumped by a pump or gravity fed through the mixed fluid inlet 130 into the coalescing separator apparatus 100. In another embodiment, the mixed fluid inlet 130 may recirculate cleaned water from the same or another coalescing separator apparatus 100.

Figure 2:
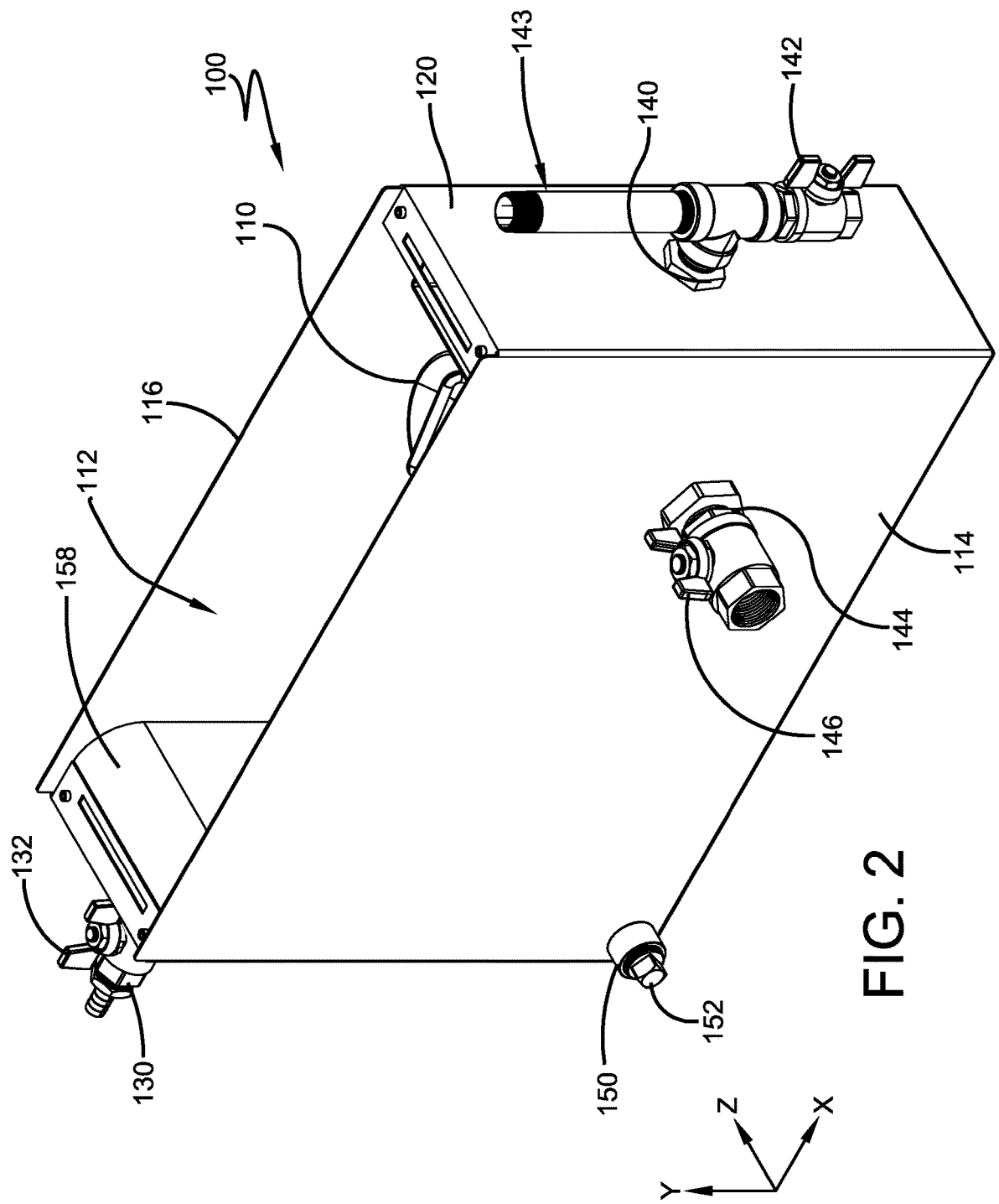
FIG. 2 is a perspective view showing a 180-degree rotation of the example oil coalescing separator of FIG. 1.

Referring to FIG. 2, which is a view showing a 180-degree rotation about the Y axis of the coalescing separator apparatus 100 from FIG. 1, the second end wall 120 is coupled to a clean water outlet 140, which is also coupled to a clean water outlet valve 142. The clean water outlet 140 is coupled to a stand-pipe 143. The clean water outlet 140 cycles water that has undergone treatment for removal of oil away from the coalescing separator apparatus 100 and back into usage in the machinery or to be safely disposed of. The term "clean water" is used in the sense that the bottom layer fluid has had lower density, immiscible, fluids removed from it through the coalescing and skimming apparatuses. However, this does not necessarily mean that the water or fluid is totally pure.

The stand-pipe 143 is configured to allow for variations in outflow volume, thus promoting continuous flow through the coalescing separator apparatus 100. A surge in fluid flowing through the clean water outlet 140 may rise into the stand-pipe 143, instead of being stopped at the clean water outlet 143 entrance and causing a back up in the coalescing separator apparatus 100.

The embodiment of FIG. 2 has the surface-skimming drain 144 (in this case referred to as an oil outlet 144 since it is discussed in terms of an oil and water mixture) coupled to the first side wall 114. The oil outlet 144 is also coupled to an outlet valve 146. Oil flows from the variable-height weir 110 into the oil outlet 144. The oil outlet 144 may lead to a collection tank (not shown), or, in an embodiment, it may feed directly back into the machinery it was originally used in. In an embodiment, the oil may be reused in the same or different machinery on-site after further purification, or it may be repurposed or disposed of.

A clean-out outlet 150 is also coupled to the bottom corner of the first side wall 114. A plug 152 is inserted in the outlet. The clean-out outlet 150 may be opened and used to remove all the contents of the coalescing separator apparatus 100 to clean it out from time to time.

Figure 3:
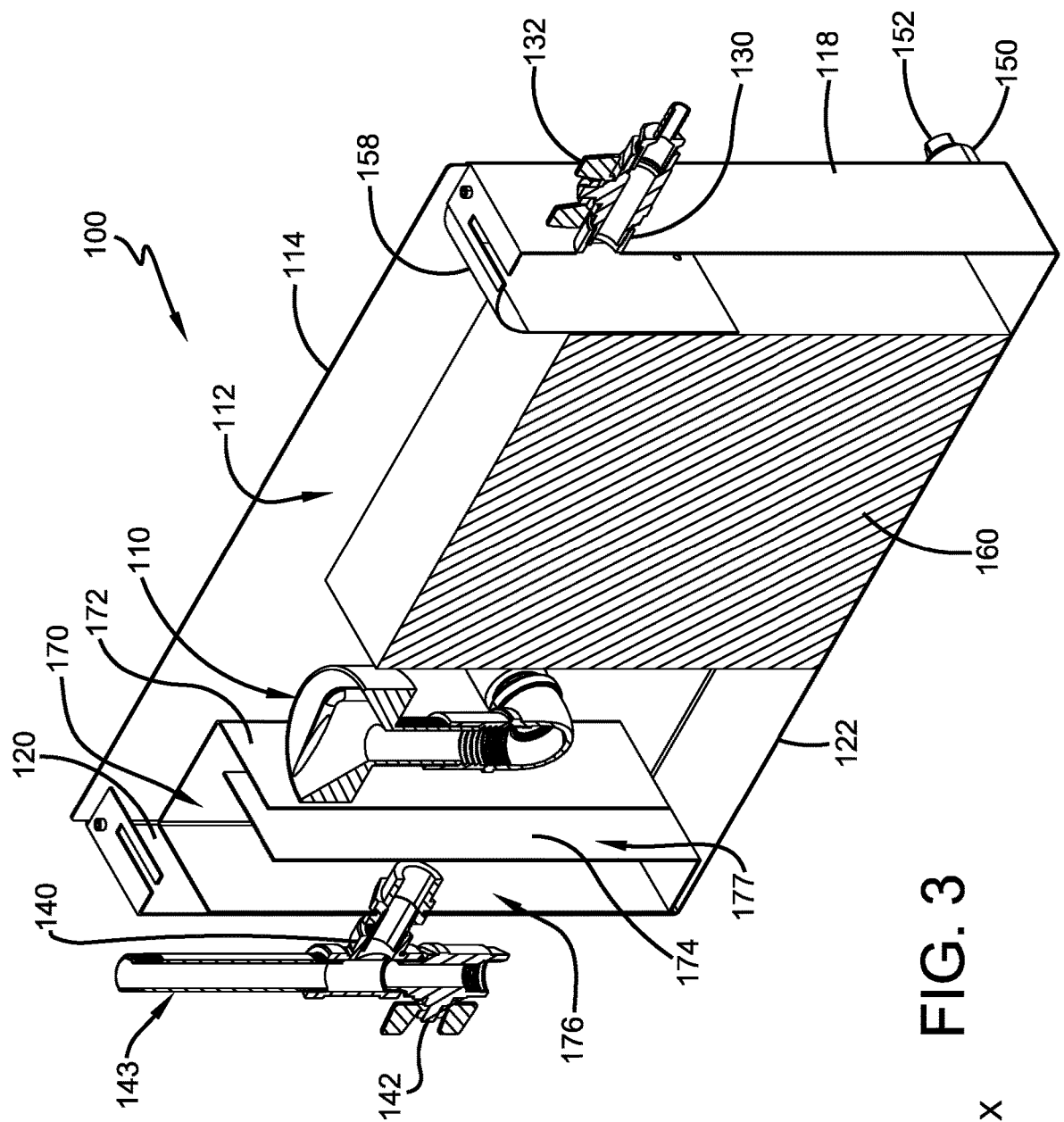
FIG. 3 is an x-axis cut-away perspective view of the example oil coalescing separator of FIG. 2.

Other features inside the containment well 112 are better seen in the cutaway view of FIG. 3. At the front of the coalescing separator apparatus 100 and coupled to the first end wall 118, and, optionally, the first and/or second side walls 114, 116 is an inlet deflector 158. The inlet deflector 158 extends from the first end wall 118 towards the center of the containment well 112 and curves towards the bottom wall 122. The inlet deflector 158 is configured to promote laminar flow into the containment well and prevent splashing and direct the inflow of mixed fluid (e.g., oil and water) from the mixed fluid inlet 130 down to contact the coalescing media 160. A smooth, laminar flow into the containment well promotes the coalescing action.

The coalescing media 160 sits at the bottom of the containment well 112, abutting a portion of the bottom wall 122 and a portion of the inlet deflector 158. The inlet 130 and the clean water outlet 140 are on opposite sides of the coalescing media. The coalescing media 160 is typically a high surface area material, and functions to provide a surface for oil droplets to coalesce and grow into large droplets. As the volume of the oil droplet increases the buoyancy of the droplets also increases and the droplets rise to the surface of the mixed fluid. The rate of rise is determined on Stoke's law and the droplets rise so long as the specific gravity of the oil is less than the specific gravity of water or other fluids that may be present in the mixed fluid.

The coalescing media 160, may, for example, be a series of stacked plates, a layered mesh, a porous structure, or a honeycomb-type structure. In an embodiment, the coalescing media 160 is an oleophilic material such as plastic, for example, polyethylene terephthalate (PET), polypropylene, and functional polymers. Carbon-based porous material may also be used.

In an embodiment, the coalescing media 160 takes up a large percentage of the volume of the containment well 112. For example, the coalescing media 160 may have a volume that is 35% to 90% of the volume of the containment well 112, such as, for example, 55% to 85%, or 65% to 80%. Normally, the oil and water level in the containment well 112 should completely cover the coalescing media 160. In an embodiment, the oil/water interface is also above the coalescing media 160 as this the most efficient level for coalescing the oil. To facilitate this, the level of the oil/water interface is finely controlled by moving the variable-height weir 110 up or down.

FIG. 3 also shows the outlet weir 170 at the far end of the containment well 112 from the inlet deflector 158. The outlet weir 170 functions to separate the relatively clean water underneath the top oil layer. The outlet weir 170 comprises a front wall 172 that has a height that is above the highest level that the variable-height weir 110 can be adjusted to. In an embodiment, the height of the front wall 172 may reach the height of the side walls and end walls 114, 116, 118, and 120. The front wall 172 does not extend to the bottom wall 122, but rather defines a passage between the bottom wall 122 and the two side walls 114, 116 for clean water to flow past and underneath the front wall 172.

The outlet weir 170 also includes a middle wall 174 that extends to the bottom wall 122, but has a height that is lower than the height of the front wall 172. The height of the middle wall of the outlet weir not adjustable. In an embodiment, in normal operation, the height of the middle wall 174 is slightly below the height of the variable-height weir 110. The back side of the front wall 172 and the middle wall 174 define a column 177 in which clean water enters and rises and during normal operation will flow over the top edge 175 of the middle wall 174 into a clean water outlet compartment 176 that is bounded in part by the back side of the middle wall 174 and separates the clean water outlet 140 from the rest of the contents of the containment well 112. In an embodiment, the front and middle walls 172, 174 are connected to the first and second side walls 114, 116, which, along with the second end wall 120 also serves as a boundary to the clean water outlet compartment 176 which is disposed behind the middle wall 174. In another embodiment, a modular weir is provided where front and middle walls 172, 174 are connected, not to the first and second side walls 114, 116, but to separate walls. In this embodiment, a separate back wall is also provided so that the outlet weir 170 is a self-contained and replaceable unit. This modular weir embodiment is further disclosed in a separate application filed by the applicant having application Ser. No. 15/701,018, filed on September which is incorporated herein by reference for all purposes.

By forcing water to flow under the front wall 172 and then rising to flow over the middle wall 174, not only oil, which is primarily coalesced into the top surface layer, but also heavy particulates and other materials are removed (typically by settling to the bottom) from the water that flows into the clean water compartment 176.

Figure 4:
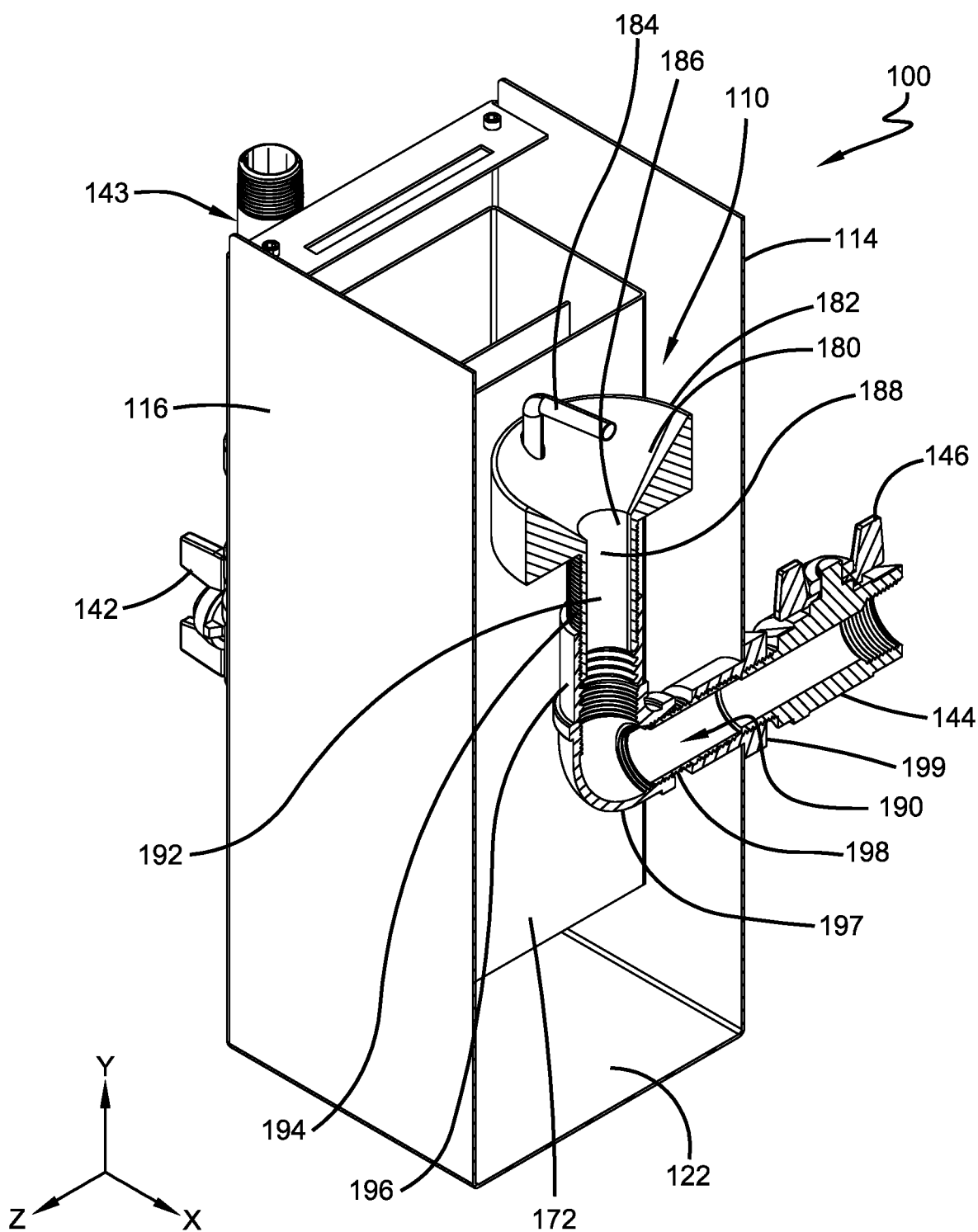
FIG. 4 is a z-axis, cut-away perspective view of the example oil coalescing separator of FIG. 2.

FIG. 4 shows an isolated cut-away of the variable-height weir 110. The variable-height weir 110 has an upward-facing sloping surface 180 that is funnel-shaped. The upward-facing surface 180 may, for example, have an angle of incline (wherein 0 degrees is defined as vertical (y-axis) and 90 degrees is defined as horizontal (x- and z-axis)) of 10 degrees to 85 degrees, such as 20 degrees to 60 degrees or 25 degrees to 45 degrees. As described above, this sloping surface provides visibility for the oil that is draining from the top of the surface of the oil and water in the containment well 112. The upward-facing sloping surface 180 has a top edge 182 that is circular and circumscribes the top of the variable-height weir 110. Other embodiments may have different geometries other than a funnel, such as, for example, inverted pyramidal or an oval or irregular shaped rimmed funnel. In an embodiment, the top edge 182 has the same height around the entire circumference.

The bottom edge 186 of the upward-facing sloping surface 180 circumscribes a vertical drain hole 188, which is coupled to an interior channel 190 that is coupled to and exits the coalescing separator apparatus 100 at the oil outlet 144. Various pipes and connectors define the channel 190 and are coupled to the oil outlet 144. The height of the oil outlet in the containment well 112 is not adjustable. The height of the variable-height weir, when set to a fixed position, has a height that is fixed in relation to the fluid level and a height that is fixed in relation to the containment well.

The variable-height weir 110 includes a vertical shaft 192 that on the interior defines a portion of the channel 190 and on the exterior comprises an inclined continuous helical thread 194 around its circumference that is threadedly engaged to a threaded receiver 196. In this embodiment, the threaded receiver 196 is connected to an elbow joint 197 that is connected to a straight pipe 198 that is connected to the oil outlet 144, but other connectors could also be used. A sealing ring 199 fits over the straight pipe 198 and connects to the first side wall 114, sealing the containment well 112. The oil outlet 144 is also connected to the sealing ring 199. Rubber gaskets and seals may be used as needed or desired for any of the outlets, inlets, or junctions to, from, and within the containment well 112.

The variable-height weir 110 is configured to be vertically movable and set to a position between a minimum height and a maximum height, the height being determined with reference to a bottom wall 122 of the containment well 112. In normal efficient operation, the variable-height weir will be adjusted to a level slightly above the height of the middle wall 174. The depth of the skimming of oil from the top of the surface can be controlled by raising or lowering the variable-height weir 110. If the operator wishes to stop the draining of oil and accumulate a greater volume and taller surface layer of oil, the variable-height weir 110 can be raised above the level of the top fluid surface. When the surface layer is thicker, this also insures a higher purity of oil flowing through the oil outlet 144, which may be desirable in some situations. A maximum height of the variable-height weir 110 should not exceed the height of the front wall 172. Normally, the variable-height weir 110 has a minimum height no lower than the top of the coalescing media 160. Optionally, a clear window may be disposed one or more side walls 114, 116, in-line with the variable height weir 110, so that it is configured to show the thickness of the oil and water layers.

By rotating the variable-height weir 110, the height of the variable-height weir 110 will go up or down as the threads recede into the threaded receiver 196 or rotate out of the threaded receiver 196. Thus, the operator can adjust the height to a level desired for achieving the desired level of skimming from the top of the surface of the oil water mixture contained in the containment well 112. In other embodiments, another rotary type mechanism may be used to adjust the height of the variable-height weir 110. In yet other embodiments linear or other adjustment mechanisms may, for example, be used to raise or lower the variable-height weir 110 to a desired level.

In an embodiment, the variable-height weir 110 further comprises a handle 184 that extends from one side of the variable-height weir 110 to the other and spans over the drain hole 188. The handle 184 provides a useful way to rotate the variable-height weir 110 without the user having to touch the oily surface of the oil and water mixture. In an embodiment, the upward-facing sloping surface 180 is substantially uncovered (except for the unobtrusive handle 184) and open to view by the operator. In an embodiment, at least a portion of the upward facing surface 180 is uncovered from a top-down view, so that an operator can view the upward-facing sloping surface 180 from above the oil/water surface. This enables the operator to visually determine the desired level of oil skimming from the surface.

In an embodiment, the inlet is configured to be open to allow about the same fluid volume to pass through as the outlet in combination with the oil outlet 144, so that a fluid level in the containment well is substantially constant. Substantially constant meaning not interfering with the efficient operation of the apparatus. The fluid level, may for example, stay within 10%, 5%, or 1% of a baseline level over a ten-minute interval.

Figure 5:
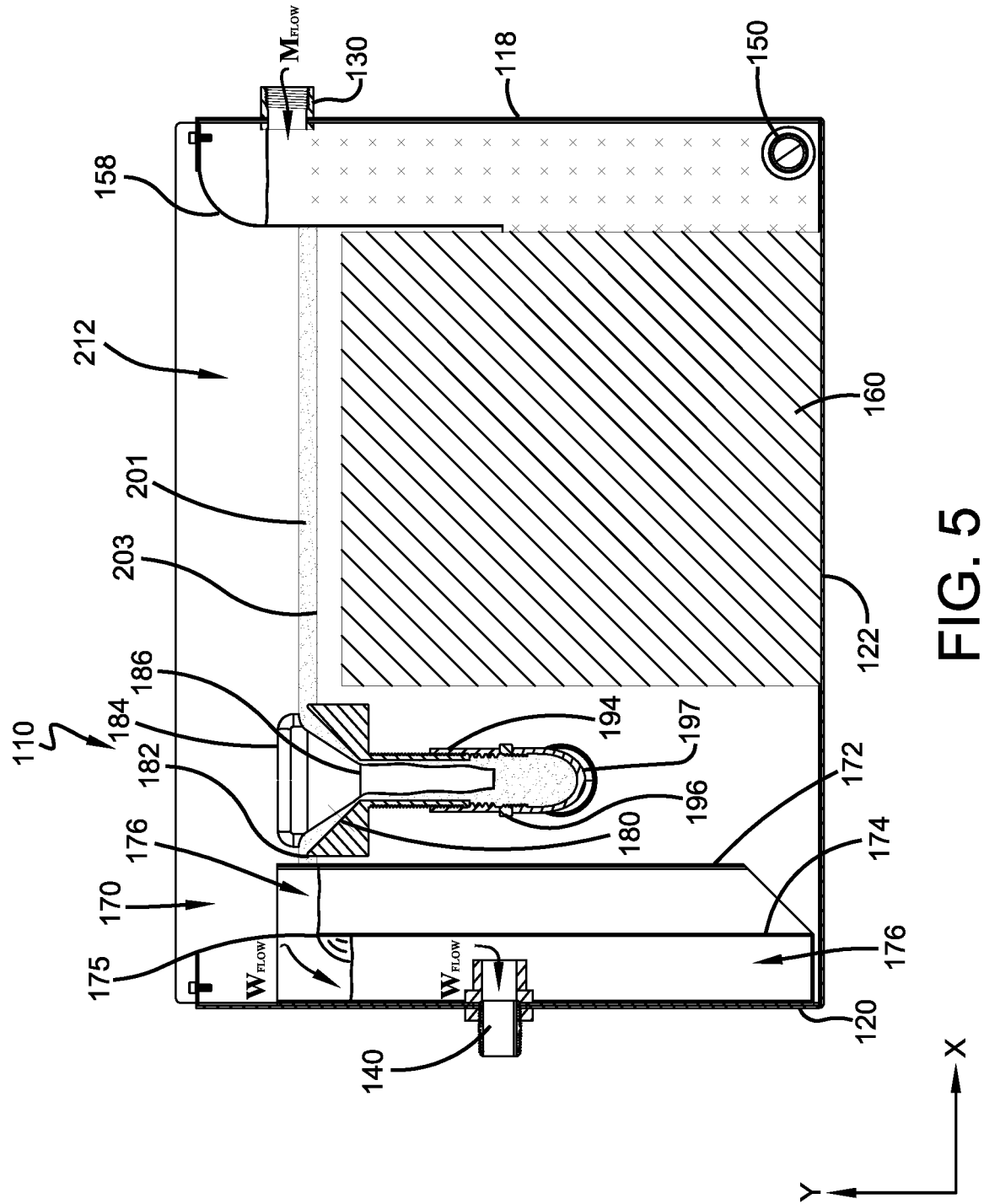
FIG. 5 is a cross-sectional view of an example oil coalescing separator including an example variable height weir in operation.

FIG. 5 is a cross-sectional view of an example coalescing separator apparatus 100 including an example variable-height weir 110 in operation. In an embodiment, a method of separating oil from water (or any other set of fluids that are immiscible) comprises the steps of flowing $M_{FLOW}$ a first and second fluid (e.g., oil and water) mixture from a mixed fluid inlet 130 into a containment well 112. The inflowing $M_{FLOW}$ fluid mixture may be pumped or gravimetrically fed through pipes or tubes coupled to the inlet mixed-fluid 130. The oil and water mixture contacts a coalescing media 160 in the containment well 112, this causes the oil to coalesce from the water and form into droplets that rise to the surface and form an oil layer 201. The separated water flows under the front wall 172 of the outlet weir 170, filling up the area between the front wall 172 and the middle wall 174 and flowing $W_{FLOW}$ over the top edge 175 of the middle wall 174 into the clean water compartment 176. The water then flows $W_{FLOW}$ out of the clean water outlet 140. Often the mixture of oil and water contains heavy particulates, such as metal shavings that will settle to the bottom wall 122 of the containment unit 112. The height of the front wall 172 is higher than the height of the middle wall 174. The height is determined with reference to a bottom wall 122 of the containment well 112.

The operator adjusts the variable-height weir 110 to a certain level to remove the desired level of oil from the oil layer 201 by draining at least a portion of the oil from the surface layer of oil through the variable-height weir 110. The oil flows through the variable-height weir 110 through the channel 190 and out of the containment well 112.

In an embodiment, the desired level may be at just above the oil/water interface, or just below the oil/water interface 203, such as, for example, from within 1 inch above or below the oil/water interface 203, within 0.1 inches above or below the oil/water interface 203, or within 0.01 inches above or below the oil/water interface 203.

In another embodiment, the level is adjusted to above the oil/water interface 203, such as 0.01 inches to 10 inches above the oil/water interface 203, 0.1 inches to 6 inches above the oil/water interface 203, or 1 inch to 2 inches above the oil/water interface 203. This may be useful in a mixture where different viscosities of oil or different types of immiscible fluid are present and the operator wishes to only drain off one level, and perhaps drain the second level after switching the container coupled to the oil outlet 144.

In another embodiment, the level is adjusted to below the oil water interface 203, such as 0.01 inches to 10 inches below the oil/water interface 203, 0.1 inches to 6 inches below the oil/water interface 203, or 1 inch to 2 inches below the oil/water interface 203. This may be useful when the operator is seeking to ensure that as much oil as possible is removed from the water even if the removed oil includes some water content.

In an embodiment that operator visually determines the proper adjustment by viewing the oil flow on the upward-facing sloping surface 180. Water droplets may form on the upward-facing sloping surface 180, indicating that the variable-height weir 110 is skimming water and oil, which may indicate to the operator that the height needs to be adjusted.

In an embodiment, the operation of oil skimming can be halted by raising the variable-height weir 110 above the height of the middle wall 174 of the outlet weir 170. When this is done, the no oil or water will drain through the variable-height weir 110. This may be done when there is no visible layer of oil to skim from the surface, allowing the system to continue to flow efficiently, e.g., without shutting down pumps or adjusting other mechanisms. Eventually, if inflowing water contains oil, the oil layer thickness will increase as clean water continues to flow over the middle wall 174 and into the clean water outlet compartment 176. If the oil layer does not begin draining through the variable-height weir 110 as a result of its lower density allowing its level to rise higher than a pure water level, the operator can adjust the variable-height weir 110 down, so that the oil layer or a portion thereof is skimmed and drained.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner such as the term "comprising." The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A coalescing separator apparatus comprising:
   a containment well including a coalescing media therein;
   an inlet and a clean fluid outlet on opposite sides of the coalescing media;
   a variable-height surface-skimming weir disposed in the containment well, coupled to a surface-skimming drain; and
   an outlet weir comprising a front wall and a middle wall, wherein a height of the front wall is higher than a height of the middle wall;
   the clean fluid outlet being disposed behind the middle wall and extending from the outlet weir; and
   the variable-height surface-skimming weir disposed spaced apart from the coalescing media and between the outlet weir and the coalescing media and configured to be vertically movable and set to a position between a minimum skimming height and a maximum skimming height at a fluid interface between a first fluid and a second fluid while maintaining a substantially constant fluid level in the containment well, the skimming height being determined with reference to a bottom wall of the containment well and is above a top of the coalescing media.

2. The coalescing separator apparatus of claim 1, wherein the middle wall has a height of 0.5 inches to 0.001 inches lower than a height of the variable-height surface-skimming weir.

3. The coalescing separator apparatus of claim 1, wherein the middle wall extends to a bottom wall of the coalescing separator apparatus and the front wall does not extend to the bottom wall of the coalescing separator apparatus but forms an opening under the front wall.

4. The coalescing separator apparatus of claim 1, wherein the variable-height surface-skimming weir comprises an upward-facing sloping surface configured to funnel the second fluid from a fluid surface through a channel to the surface-skimming drain.

5. The coalescing separator apparatus of claim 1, wherein a height of the surface-skimming drain in the containment well is not adjustable.

6. The coalescing separator apparatus of claim 1, wherein the height of the middle wall of the outlet weir is not adjustable.

7. The coalescing separator apparatus of claim 1, wherein the skimming height of the variable-height surface-skimming weir, when set to a fixed position, has a height that is fixed in relation to the fluid level in the containment well and a height that is fixed in relation to the containment well.

8. The coalescing separator apparatus of claim 1 further comprising a stand-pipe rising from the clean fluid outlet for offsetting variations in outlet volume in order to maintain a continuous flow through the containment well.

9. The coalescing separator apparatus of claim 1, wherein the variable-height surface-skimming weir is configured to be adjusted to be higher than the height of the middle wall.

10. The coalescing separator apparatus of claim 1, wherein the inlet is configured to be open to allow the same fluid volume to pass through as the clean-fluid outlet in combination with the surface-skimming drain, so that a fluid level in the containment well is substantially constant.

11. The coalescing separator apparatus of claim 1, wherein the variable-height surface-skimming weir has an upward-facing sloping surface that is funnel-shaped.

12. A method for separating a first fluid and a second fluid, comprising:
    flowing a mixture comprising the first fluid and the second fluid into a containment well that comprises a coalescing media;
    allowing the second fluid to coalesce from the first fluid and form a surface layer of the second fluid;
    adjusting a variable-height surface skimming weir disposed spaced apart from the coalescing media and between the outlet weir and the coalescing media in the containment well to a selected skimming height relative to a bottom wall of the containment well, above a top of the coalescing media, and while maintaining a substantially constant fluid level in the containment well;
    draining at least a portion of the second fluid from the surface layer of the second fluid through the variable-height surface-skimming weir; and
    flowing the first fluid out of the containment well.

13. The method of claim 12, wherein the first fluid is water and the second fluid is an oil.

14. The method of claim 12, further comprising adjusting the variable-height surface-skimming weir to a level above the surface layer when there is no visible surface layer of the second fluid.

15. The method of claim 12, wherein a third fluid is also present in the mixture, and further comprising adjusting the variable-height surface-skimming weir to a selected level to remove at least a portion of the second and third fluid.

16. The method of claim 12, wherein the containment well comprises an outlet weir that includes a front wall and a middle wall with a clean fluid outlet disposed behind the middle wall, and a height of the front wall is higher than a height of the middle wall.

17. The method of claim 16, wherein the skimming height of the variable-height surface-skimming weir is adjusted to be 0.5 inches to 0.001 inches higher than a height of the middle wall.

18. The method of claim 16, wherein the first fluid flows under the front wall of the outlet weir and over the middle wall of the outlet weir.

19. A coalescing separator apparatus comprising:
    a means for containing a mixture of a first fluid and a second fluid, including
    a means for coalescing the second fluid;
    a means for inflowing the mixture and a means for outflowing the first fluid disposed on opposite sides of the means for coalescing;
    a means for skimming a surface layer of the second fluid disposed spaced apart from the means for coalescing and between the means for outflowing the first fluid and the means for coalescing, the means for skimming a surface layer including a means for vertically varying a skimming height of the means for skimming the surface layer above a top of the means for coalescing while maintaining a substantially constant fluid level of the mixture.

20. The coalescing separator apparatus of claim 19, wherein the means for skimming the surface layer of the second fluid further comprises a means for visually determining a level of the first fluid and second fluid that is being skimmed.

* * * * *